Oct. 8, 1968    J. A. KEDER, JR    3,404,737
CONTROL MECHANISM FOR SWIVEL TAIL OF AN AIRCRAFT
Filed July 8, 1966    4 Sheets-Sheet 3

INVENTOR
JOHN A. KEDER, JR.
BY    ATTORNEY

Oct. 8, 1968 J. A. KEDER, JR 3,404,737
CONTROL MECHANISM FOR SWIVEL TAIL OF AN AIRCRAFT
Filed July 8, 1966 4 Sheets-Sheet 4
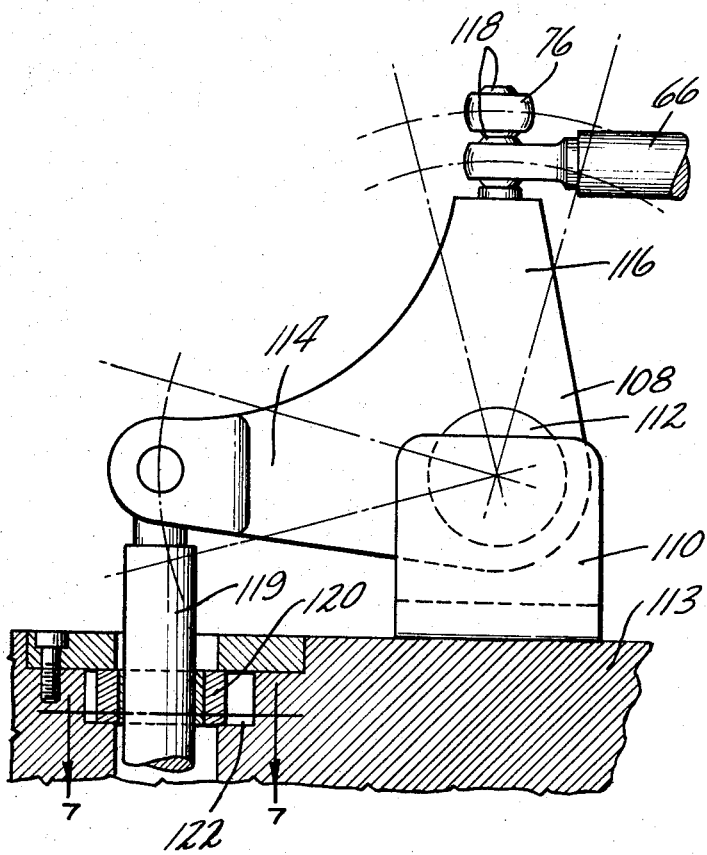
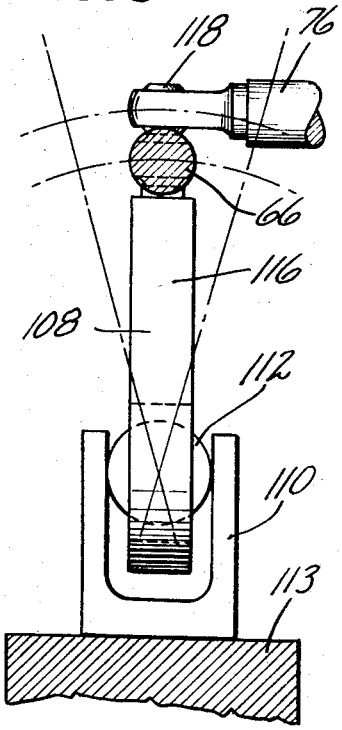
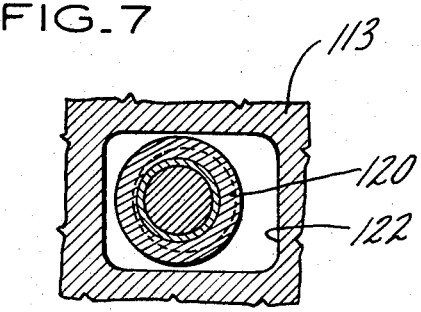
INVENTOR
JOHN A. KEDER, JR.
BY M. B. Tasker
ATTORNEY

United States Patent Office 3,404,737
Patented Oct. 8, 1968

3,404,737
CONTROL MECHANISM FOR SWIVEL TAIL
OF AN AIRCRAFT
John A. Keder, Jr., Milford, Conn., assignor to United
Aircraft Corporation, East Hartford, Conn., a corporation of Delaware
Filed July 8, 1966, Ser. No. 563,821
12 Claims. (Cl. 170—135.22)

ABSTRACT OF THE DISCLOSURE

A convertiplane has a single main rotor and a variable pitch tail rotor which can be swivelled 90° between a lateral thrust position and a forward thrust position. The pitch of the tail rotor is varied by two pilot actuated controls, one a yaw control for helicopter flight and the other a throttle control for airplane flight, in which the transition between helicopter and airplane flight is accomplished in a smooth and continuous manner throughout the 90° swivelling movement of the tail rotor, one control being phased out as the other is phased in over the entire 90° range of swivelling movement of the tail rotor.

---

This invention relates to aircraft capable of flying at low speed as a helicopter and at high speed as an airplane, commonly known as convertiplanes. The invention is particularly concerned with convertiplanes of the type having a single primary rotor providing lift during vertical flight and low speed flight, as in takeoff and landing, and having a rear mounted rotor which can be swivelled 90° about a vertical axis between one position in which it acts as a propeller to provide forward thrust when flying as an airplane and another position in which it acts as an anti-torque rotor to provide yaw control when flying as a helicopter.

It is a primary object of this invention to provide a swivelling tail rotor for a convertiplane having variable pitch blades, the pitch of which is controlled by the usual pilot's pedals to provide yaw control when flying as a helicopter and by the usual throttling control to vary forward thrust when flying as an airplane, the transition between yaw control and throttling control being accomplished solely by the act of swivelling the tail rotor between its lateral thrust position and its forward thrust position.

It is another object of this invention to provide such a swivelling tail rotor having a single output (pitch control) and dual inputs (yaw control and throttling control) in which the transition from one input control to the other is accomplished in a smooth and continuous manner throughout the entire 90° swivelling movement of the tail rotor, one control being phased in as the other is phased out over the entire 90° range of swivelling movement of the tail rotor.

It is another object of this invention to provide a convertiplane of this general type in which yaw control of the convertiplane in helicopter flight corresponds with the yaw controls of a conventional single-lift-rotor helicopter by controlling the pitch of the anti-torque rotor from the pilot's pedals.

Still another object of this invention is to provide speed control of the convertiplane in airplane flight by improved means for the control of the pitch of the tail rotor from the usual speed control handle of an airplane, which may be normally locked in slow-speed helicopter flight.

A further object of this invention is to provide control mechanism that permits authority of the two inputs, namely the yaw control and the speed control, over the single output pitch control solely as a function of the swivel angle of the tail rotor.

A yet further object of this invention is to provide a convertiplane of the swivel tail rotor type above described having two inputs (yaw and speed control) and a single output (pitch control) in which it is not necessary for the input controls to be zeroed in order to swivel the tail rotor.

Another object of this invention is the provision of a control mechanism for a swivel tail rotor having separate yaw and speed control inputs and a separate pitch control output in which the operating connections between the yaw control input and the pitch control output and between the speed control input and the pitch control output are both maintained at all times during both the helicopter and the airplane modes of operation, the degree of operativeness of the connections being solely dependent upon the swivel angle of the tail rotor.

Another object of this invention is to provide a dual-input-selective-output bell crank mechanism for a swivel tail rotor as above described.

Still another object of this invention is generally to improve the controls for swivel rotor-type convertiplanes.

These and other objects and advantages of this invention will be evident or will be specifically pointed out in the following detailed description of three closely related embodiments of the invention shown in the accompanying drawings.

In these drawings,

FIG. 5 is a side elevation of still another form of the invention;

FIG. 6 is an end view of FIG. 5; and

FIG. 7 is a sectional detail taken on line 7—7 of FIG. 5.

Figure 1:
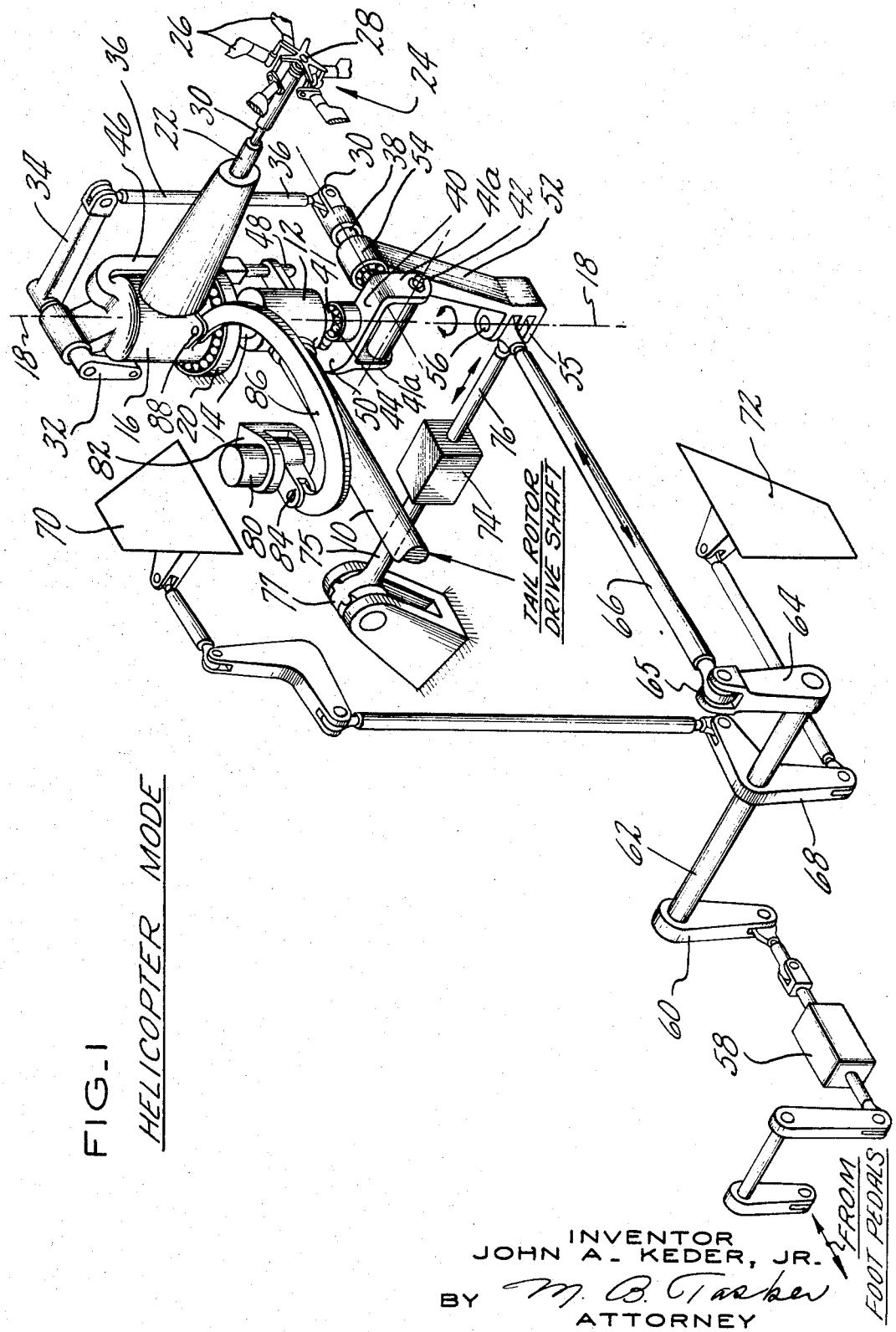
FIG. 1 is a somewhat diagrammatic perspective view of one form of the invention which was adapted to the space limitations of an existing aircraft, the helicopter mode of operation being shown.

Referring to FIG. 1, a tail rotor drive shaft 10 is shown extending into a right-angled gearbox 12 which is carried by fixed aircraft structure. A vertical drive shaft 14 extends upwardly from the gearbox 12 into a second right-angled gearbox 16. This gearbox is mounted for swivelling movement about the vertical axis 18 on a bearing 20 suitably carried by fixed aircraft structure. The swivelling axis 18, it will be noted, lies on the center line of both gearboxes as well as the rotational axis of shaft 14. Gearbox 16 has usual bevel gearing which drives a horizontal shaft 22 which carries rotor head 24 at its extended end. Rotor head 24 carries a plurality of variable pitch blades 26, each having a pitch changing horn which is connected by a usual rod to one arm of a spider 28 carried by the end of an axially reciprocable pitch changing beam 30. Beam 30 is reciprocated by means of a bell crank, one arm 32 of which is pivotally connected to beam 30 and the other arm 34 of which is connected by a control link 36 to one arm 38 of a dual-input-selective-output control mechanism with which this invention is particularly concerned.

The dual-input-selective-output mechanism consists of a supporting member 40 which has two spaced depending arms 41a between which the left-hand end of arm 38 (FIG. 1) is pivotally mounted on a pin 42 which is the pivot pin about which arm 38 moves. Member 40 is itself pivotally mounted by means of a bearing 44 on the vertical stub shaft 41 carried by gearbox 12. This stub shaft lies in the swivel axis 18 so that supporting member 40 together with its control arm 38 is free to swivel about axis 18 together with gearbox 16. The two are operatively connected for this swivelling movement by an arm 46 depending from gearbox 16 and terminating in a pin 48 which is secured in one end of a horizontal right-angle arm 50 formed integral with support member 40. This right-angle arm shows most clearly in FIG. 2.

The control arm 38, which is operatively connected with the pitch changing beam through control link 36, and bell crank arms 32 and 34, constitutes the selective-output member, or pitch control member, of the control mechanism. The dual-input arm 52 of the control mechanism is supported at one end on arm 38 by a bearing 54 and depends from arm 38. At its depending end arm 52 terminates in a laterally-directed, dual-clevis configuration 55 the common pivot pin 56 of which lies in swivel axis 18 in what might be called the neutral position of the control mechanism, in which no input signal is present. Arm 52 constitutes the dual-input arm of the control mechanism which swivels with supporting member 40 and control arm 38.

The dual-input-selective-output mechanism of this invention is adapted to receive alternately the throttling control signal of the usual airplane and the yaw control signal of the usual helicopter merely by the act of swivelling the tail rotor about axis 18.

FIG. 1 shows the usual pedal operated yaw control for a helicopter including the tandem servo 58 which is connected to arm 60 of a transverse shaft 62. A second arm 64 on shaft 62 is connected by a self-aligning bearing 65 to the forward end of a control rod 66 which is pivotally connected at its aft end to pin 56 by a self-aligning bearing between one portion of the dual clevis 55 at the depending end of arm 52.

A bell crank 68 fixed on shaft 62 operates the upper and lower rudders 70, 72 through conventional linkage simultaneously with the operation of pitch changing input control rod 66.

The usual throttling control of an airplane is represented in FIG. 1 by the actuator 74 which reciprocates a throttling thrust input rod 76, the free end of which is connected by a self-aligning bearing to pin 56 at the second portion of clevis 55 at the depending end of control arm 52. The actuator 74 is pivotally mounted to fixed aircraft structure through rod 75 and self-aligning bearing 77. It will be noted that input rod 66 lies parallel with control arm 38 in the helicopter mode of operation shown in FIG. 1 while in the FIG. 2 airplane mode of operation, in which the dual-input-selective-output mechanism has been swivelled 90° counterclockwise (FIG. 1), the rod 66 is at right angles to control arm 38. Thrust rod 76 of the throttle control is at right angles to control arm 38 when the tail rotor is in the FIG. 1 helicopter mode of operation and is parallel therewith in the FIG. 2 airplane mode of operation. It should be emphasized that the tail rotor is free to swivel regardless of the position of the pin 56, which may have been displaced from axis 18 due to an input through either rod 66 or 76, and that such swivelling will not alter the position of the pin 56. While the authority of the inputs is effected by such swivelling, in a manner to be hereinafter described, no movement of the input rods 66 or 76 is caused.

Figure 2:
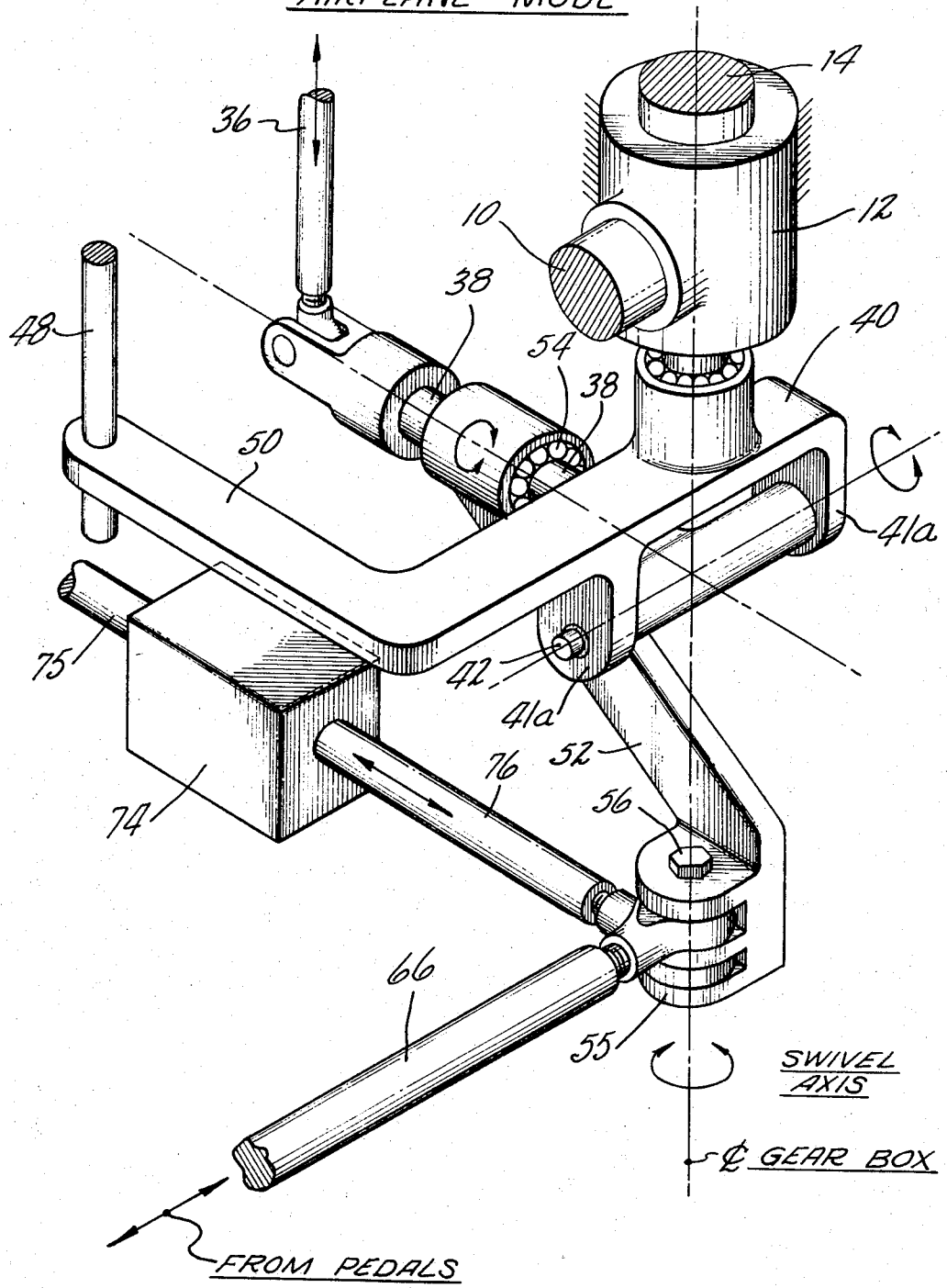
FIG. 2 is a similar perspective view illustrating the airplane mode of operation of the controls of FIG. 1.

From the above description it will be clear that when the tail rotor, including gearbox 16, is swivelled 90° from the FIG. 1 to the FIG. 2 position, the dual-input-selective-output mechanism together with the link 36 will swivel as a unit. This swivelling movement is controlled from the pilot's cockpit to rotate a shaft 80 which is journalled in a bifurcated bracket 82 carried by fixed aircraft structure. Shaft 80 has an arm 84 fixed to it, and located between the furcations of the bracket, which arm 84 is pivotally connected to a C-shaped link 86, the opposite end of which is pivotally connected to an ear 88 on the side of gearbox 16 such that counterclockwise rotation of shaft 80 (FIG. 1) will result in a torque being exerted on the gearbox to rotate the latter counterclockwise.

The operation of this form of the invention will be clear from a consideration of the two modes of operation shown in FIGS. 1 and 2 in which the dual-input-selective-output bell crank mechanism is shown in the helicopter and airplane modes of operation, respectively.

In FIG. 1, it will be noted, when control rod 66 is displaced in the fore and aft direction, this movement of the rod will cause control arm 52 to swing arm 38 about its pivot pin 42 to actuate link 36, bell crank arms 34, 32, pitch changing beam 30, and change the pitch of rotor blades 26, thus to provide full yaw control of the convertiplane. This full swinging movement of arm 38 of the dual input mechanism occurs because arm 38 is in its fore and aft position aligned with rod 66. In this FIG. 1 position of the parts, displacement of the throttling thrust rod 76 will have no effect on pitch control, resulting merely in pivotal movement of arm 52 about arm 38 at bearing 54.

In FIG. 2 in which the tail rotor has been swivelled 90° into position to act as a pusher propeller, displacement of rod 66 will cause control arm 52 to rotate ineffectively about arm 38 at bearing 54 while displacement of thrust rod 76 will cause arm 52 to swing arm 38 about its pivot pin 42 and actuate link 36, bell crank arms 34 and 32, and pitch changing beam 30 to change the pitch of blades 26.

It is important to note that during the 90° swivelling movement of the tail rotor from the FIG. 1 position to the FIG. 2 position, or vice versa, both the yaw input, displacing control rod 66, and the throttling input, displacing thrust rod 76, are effective during the entire swivelling movement. Starting with the FIG. 1 position of the mechanism, it will be evident that as the tail rotor swivels, the authority of the yaw control signal will be gradually diminished until in the FIG. 2 position it is zero. Likewise the authority of the throttling control signal, which is zero in FIG. 1, will gradually be increased to a maximum in the FIG. 2 position. As a result, the authorities of the two input control signals are phased in and out smoothly during the transition of the tail rotor between helicopter and pusher modes of flight, the control arm 38 of the dual-input-selective-output bell crank mechanism accepting a portion of each signal depending upon the swivel angle. This is accomplished by the control mechanism of this invention without disconnecting any of the control connections at any time.

Figure 3:
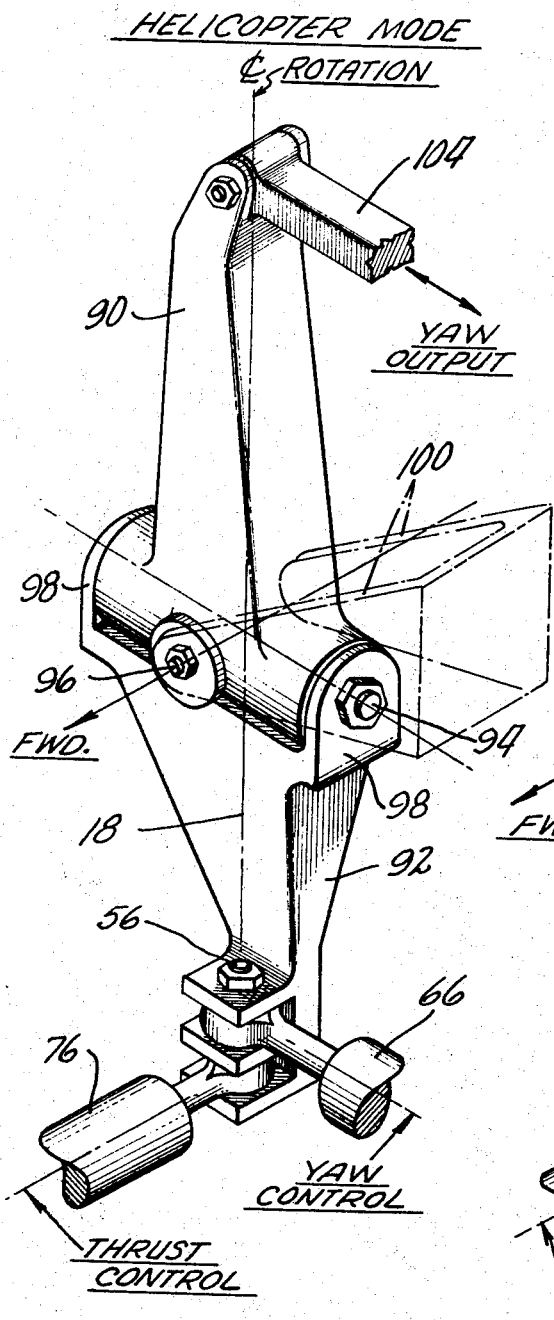
FIGS. 3 and 4 are perspective views of a modified form of the control mechanism shown in the helicopter and airplane modes of operation respectively.
Figure 4:
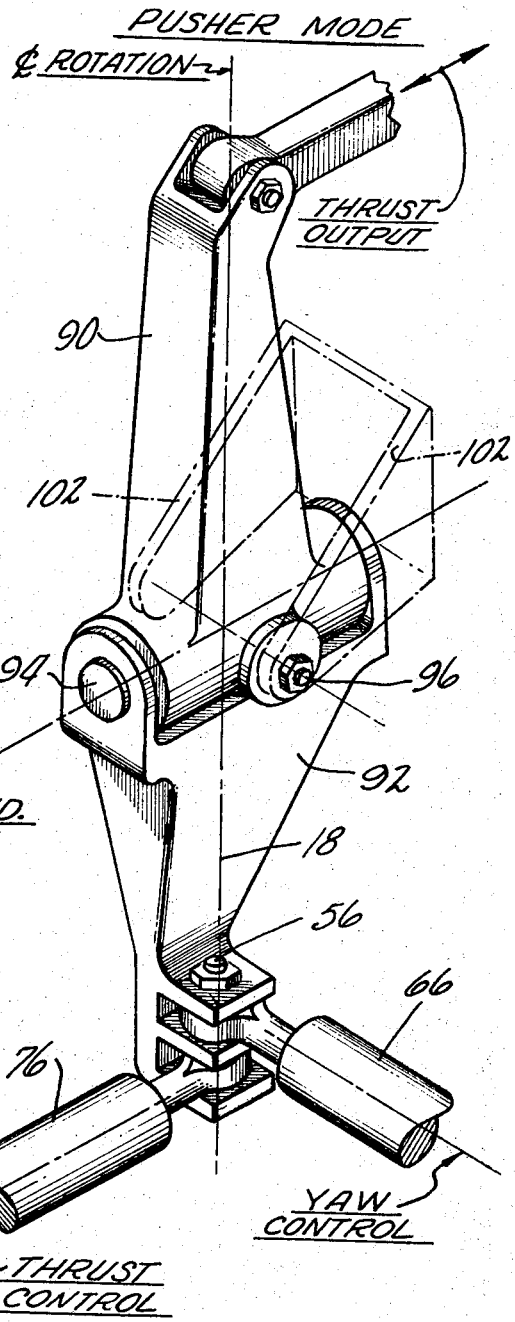

In FIGS. 3 and 4 a modified construction is shown in which a output arm 90 and an input arm 92 have a universal joint support on right-angle related pins 94 and 96 which intersect at the axis 18 of swivelling movement of the rotor, the pins 94 and 96 being mounted in parallel arms 98 of input arm 92 and in parallel arms 100 of a bracket 102, shown in phantom, mounted for swivelling movement with the tail rotor. Output arm 90 connects to a link 104 which actuates the pitch changing beam of the tail rotor to change the pitch of the blades. Input arm 92 has a double clevis construction at its free end similar to that shown in FIGS. 1 and 2 in which the common pivot pin 56 lies in the axis of swivelling movement of the tail rotor when input rods 66 and 76 are not displaced by an input signal.

As in the construction of FIGS. 1 and 2, an input signal from rod 66 in FIG. 3 will result in movement of output arm 90 about pivot pin 96 to provide yaw control by the tail rotor which is in the anti-torque position. Any input from thrust rod 70 will result in an ineffective movement of input arm 92 about pin 94.

In the FIG. 4 position of the parts, in which the tail rotor has been swivelled a full 90° into its pusher position, any input displacement of control rod 66 will rotate input arm 92 about pin 94 without imparting any movement to output arm 90, while displacement of thrust rod 76 of the throttling control will result in movement of output arm 90 to change the pitch of the blades of the tail rotor.

As in the FIGS. 1 and 2 embodiment of the invention, swivelling of the tail rotor from the FIG. 3 to the FIG. 4 position, for example, results in a gradual phasing in of the throttling control authority of thrust rod 76 and a like gradual phasing out of the yaw control authority of rod 66 over the entire 90° range of swivelling movement of the tail rotor. Thus arms 90 and 92, like arms 38 and 52 in FIGS. 1 and 2, function somewhat as a bell crank except in the full helicopter or full airplane position of the tail rotor.

In FIGS. 5, 6 and 7 a modified form of the dual-input-selective-output mechanism is shown in which a bell crank 108 is mounted on a bracket 110 by a ball joint 112. Bracket 110 is carried by a part 113 of the swivelling tail rotor. Bell crank 108 has an output arm 114 and an input arm 116. Control rod 66 of the yaw controls and thrust rod 76 of the throttling controls are connected to the end of bell crank arm 116, each by means of a self-aligning bearing 118, the rods being at 90° relative to each other as in the previous forms with the axis of the ball joints lying in the swivelling axis of the tail rotor when no input signal is present from either thrust rod 76 or 66. The output arm 114 of bell crank 108 is connected by a self-aligning bearing (not shown) to an output rod 119 which actuates the pitch changing beam of the tail rotor. In order to maintain the output arm 114 and the rod 119 in the same plane during swivelling, rod 119 is extended through a guide collar 120 (FIG. 7) which is free to float through a limited distance in a slot 122 in part 113 as is shown in FIG. 5 and in detail in FIG. 7 but is prevented from lateral movement relative to the slot.

The bell crank mechanism is shown in FIGS. 5 and 6 in the helicopter mode of operation in which any inline motion of yaw control rod 66 will rock the bell crank about its ball support 112 in the planes of the bell crank arms 114, 116 to actuate output rod 119 to change the pitch of the anti-torque rotor blades and provide yaw control. Movement of thrust rod 76 in this position of the bell crank will have no effect on rod 119.

By swivelling the bell crank 108 90°, the thrust rod 76 from the throttling control will be effective to actuate the bell crank to move output rod 119, while movement of control rod 66 will be ineffective to control rod 119.

As in the previously described forms of the invention, during swivelling movement of the bell crank from helicopter mode to airplane mode, for example, the yaw control signal authority is gradually decreased over the entire 90° swivelling movement while the throttling control authority is gradually increased.

It will be evident that as a result of this invention, a very simple and reliable control mechanism has been provided for the yaw and throttling controls of a convertiplane in which the authority of the yaw and throttling controls is phased in and out smoothly and gradually during the entire 90° swivelling movement of the tail rotor between the two modes of operation.

It will further be evident that this improved and simplified mechanism permits the authority of the two inputs over the single output to alternate automatically as a function of the swivel angle of the tail rotor, and that this is accomplished without the disconnection and subsequent connection of any of the control linkage.

Further, the mechanism of this invention can be utilized with the usual yaw control mechanism of a helicopter and the usual throttling control mechanism of an airplane. It will also be noted that the dual-input-selective-output mechanism of this invention does not require that the two inputs be zeroed before the tail rotor can be swivelled, and since there is nothing to be connected or disconnected during change from one mode of flight to the other, flight procedures are greatly simplified.

Three forms of the invention have been shown, but it will be understood that many changes are possible in the construction and arrangement of the parts without exceeding the scope of the invention as defined in the following claims.

I claim:

1. In a convertiplane, a tail rotor mounted for swivelling movement about a vertical axis between a lateral thrust position and a forward thrust position, said rotor having variable pitch blades, a member for changing the pitch of said blades collectively, pitch control mechanism mounted for swivelling movement with said tail rotor including dual input-selective-output means mounted for limited universal movement, said means including an output arm having its free end connected to said pitch changing member and an input arm having its free end normally in the swivelling axis of said tail rotor, and two pilot controlled input members carried by fixed aircraft structure, one movable in a fore and aft direction and the other in a lateral direction, each of said members having a pivotal connection to the free end of said input arm which lies in said swivelling axis when neither input member is displaced by a control signal from the pilot.

2. The combination claimed in claim 1 in which the input and output arms of the pitch control mechanism pivot about axes which intersect at right angles to each other at the swivelling axis of the tail rotor.

3. The combination claimed in claim 1 in which the input and output arms of the pitch control mechanism comprise integral arms of a bell crank which is mounted on a universal joint on structure which swivels with said tail rotor.

4. The combination of claim 3 in which means are provided for maintaining said output arm in alignment with said pitch changing member.

5. The combination claimed in claim 1 in which the pilot controlled input members are thrust links provided with ball joint connections to the free end of said input arm.

6. In a convertiplane, a tail rotor mounted for 90° swivelling movement about a vertical axis between a lateral anti-torque position and a rear pusher position, said rotor having variable pitch blades, means for changing the pitch of said rotor blades, and a dual-input-selective-output control mechanism for said pitch changing means including a pivoted output arm having an operative connection at its free end with said pitch changing means, a pivoted input arm having connections at its free end with pilot operated yaw and throttle controls, means for supporting said input and output arms for swivelling movement with said tail rotor, the pivots for said input and output arms being at right angles to each other, and said yaw and throttle controls comprising thrust members having their thrust axes at substantially right angles to the axes of pivotation of said input and output arms when said tail rotor is in said anti-torque and pusher positions.

7. In a convertiplane, a tail rotor mounted for swivelling movement about a vertical axis between a lateral thrust position and a forward thrust position, said rotor having variable pitch blades, means for changing the pitch of said blades collectively, and dual-input-selective-output control mechanism for said pitch changing means including a pivoted output arm mounted for swivelling movement with said tail rotor about the swivelling axis of the latter and having its pivot at right angles to said swivelling axis, a pivoted input arm mounted for swivelling movement with said tail rotor and having its pivot axis at right angles to the pivot axis of said output arm, said input arm having connections at its free end for pivotal attachment of yaw and throttle control thrust rods carried by fixed structure of the aircraft having their thrust axes at substantially 90° to each other.

8. The combination of claim 7 in which the pivots connecting said thrust rods to the free end of said input arm lie in the swivelling axis of said tail rotor when no input signal is present from either thrust rod.

9. The combination of claim 7 in which the input arm is pivoted on the output arm intermediate the ends of the latter.

10. In a convertiplane, a tail rotor mounted for swivelling movement about a vertical axis between a lateral thrust position and a forward thrust position, said rotor having variable pitch blades, means for changing the pitch of said blades collectively, and dual-input-selective-output control mechanism for said pitch changing means including a pivoted input arm and a pivoted output arm mounted for swivelling movement with said tail rotor about the swivelling axis of the latter, said output arm being movable about a pivot axis at right angles to said swivelling axis in any position of said tail rotor between its forward and lateral positions to actuate said pitch changing means, said input arm having its pivotal axis at right angles to the pivot axis of said output arm, and yaw and throttle control links carried by fixed structure of the aircraft having their thrust axes at substantially right angles to each other and pivotally connected to the free end of said input arm.

11. In a convertiplane, a tail rotor mounted for swivelling movement about a vertical axis between a lateral thrust position and a forward thrust position, said rotor having variable pitch blades, means for changing the pitch of said blades collectively, and dual-input-selective-output control mechanism for said pitch changing means including a pivoted input arm and a pivoted output arm mounted for swivelling movement with said tail rotor about the swivelling axis of the latter, said input and output arms having pivotal axes at right angles to each other intersecting at the swivelling axis of said tail rotor, and yaw and throttle control means including thrust rods carried by fixed aircraft structure having their thrust axes arranged at substantially 90° to each other, each of said thrust rods having its thrust axis perpendicular to the pivotal axis of one of said input and output arms in the lateral thrust and forward thrust positions of said tail rotor, said rods having pivotal connections at the free end of said input arm, whereby said yaw control rod exerts maximum authority on said pitch changing means when said tail rotor is in its lateral thrust position and said throttle control rod is substantially ineffective, and said throttle control rod exerts maximum authority on said pitch changing means when said tail rotor is in its forward thrust position and said yaw control rod is substantially ineffective.

12. In a convertiplane, a tail rotor mounted for swivelling movement about a vertical axis between a lateral thrust position and a forward thrust position, said rotor having variable pitch blades, blade pitch changing mechanism, and dual-input-selective-output control mechanism for said pitch changing mechanism including a pivoted input arm and a pivoted output arm having their pivotal axes at right angles to each other, two input thrust rods, said output arm having a pivotal connection to said blade pitch changing mechanism at its free end and said input arm having a pivotal connection to said input thrust rods at its free end, said rods being carried by fixed aircraft structure and having their thrust axes at substantially 90° to each other, said input and output arms having an operative connection to said tail rotor for swivelling movement therewith and said arms having the intersection of their right angle axes at said swivelling axis, whereby the pivotal axis of said output arm is perpendicular to the thrust axis of said yaw control rod in the lateral thrust position of said tail rotor and perpendicular to the thrust axis of said throttle control rod in the forward thrust position of said tail rotor.

References Cited

UNITED STATES PATENTS

| | | | |
|---|---|---|---|
| 2,385,889 | 10/1945 | Skavinsky | 170—135.22 X |
| 2,491,191 | 12/1949 | Maillard et al. | 170—135.22 |
| 2,704,128 | 3/1955 | Papadakos | 170—135.24 X |
| 2,959,373 | 11/1960 | Zuck | 244—7 |
| 3,155,341 | 11/1964 | Girard. | |

FOREIGN PATENTS 573,127  11/1945  Great Britain.

EVERETTE A. POWELL, JR., *Primary Examiner.*